US012654419B2

(12) United States Patent
Ingalls

(10) Patent No.: US 12,654,419 B2
(45) Date of Patent: *Jun. 16, 2026

(54) MATTING SYSTEM

(71) Applicant: Diamond T Services, Inc., Golden, CO (US)

(72) Inventor: James Ingalls, Arvada, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/349,464

(22) Filed: Jul. 10, 2023

(65) Prior Publication Data

US 2024/0416613 A1     Dec. 19, 2024

Related U.S. Application Data

(60) Division of application No. 17/342,491, filed on Jun. 8, 2021, now Pat. No. 11,697,264, which is a
(Continued)

(51) Int. Cl.
| | |
|---|---|
| *B32B 3/08* | (2006.01) |
| *B32B 3/06* | (2006.01) |
| *B32B 3/14* | (2006.01) |
| *B32B 3/18* | (2006.01) |
| *B32B 7/08* | (2019.01) |
| *B32B 7/12* | (2006.01) |
| *B32B 21/02* | (2006.01) |
| *B32B 21/04* | (2006.01) |
| *B32B 21/08* | (2006.01) |

(Continued)

(52) U.S. Cl.
CPC ............... *B32B 3/085* (2013.01); *B32B 3/06* (2013.01); *B32B 3/14* (2013.01); *B32B 3/18* (2013.01); *B32B 7/08* (2013.01); *B32B 7/12*

(2013.01); *B32B 21/02* (2013.01); *B32B 21/042* (2013.01); *B32B 21/08* (2013.01); *B32B 27/304* (2013.01); *B32B 27/32* (2013.01); *E01C 5/22* (2013.01); *E01C 9/08* (2013.01); *E02D 31/004* (2013.01); *B32B 2250/03* (2013.01); *B32B 2255/26* (2013.01); *B32B 2264/102* (2013.01); *B32B 2307/712* (2013.01); *B32B 2307/714* (2013.01); *B32B 2307/7265* (2013.01); *B32B 2307/744* (2013.01); *B32B 2471/04* (2013.01); *E04H 6/428* (2013.01); *E21B 41/00* (2013.01); *Y10T 428/18* (2015.01); *Y10T 428/183* (2015.01); *Y10T 428/197* (2015.01); *Y10T 428/24058* (2015.01); *Y10T 428/24091* (2015.01)

(58) Field of Classification Search
None
See application file for complete search history.

(56) References Cited

U.S. PATENT DOCUMENTS

| | | | | |
|---|---|---|---|---|
| 10,006,273 B2 * | 6/2018 | Ingalls | ..................... | B32B 3/06 |
| 10,315,378 B2 * | 6/2019 | Ingalls | ..................... | B32B 3/18 |

* cited by examiner

*Primary Examiner* — Alicia Chevalier
(74) *Attorney, Agent, or Firm* — Holland & Hart LLP

(57) ABSTRACT

Improved containment mats and systems of containment mats may include multiple adjoining mats with a top surface and a bottom surface. The multiple mats may provide a modular structural mat system that may be installed at a drill site, with multiple mats placed adjacent to each other with a lap joint connecting adjacent mats. A geotextile may be used to cover the lap joints and a coating applied to the geotextile. Such a system may provide containment of potential spills, a reliable working surface for drilling operations, and relatively fast and less expensive installation.

8 Claims, 11 Drawing Sheets

SECTION EE

Related U.S. Application Data continuation of application No. 16/436,568, filed on Jun. 10, 2019, now Pat. No. 11,046,040, which is a continuation of application No. 15/294,165, filed on Oct. 14, 2016, now Pat. No. 10,315,378, which is a continuation-in-part of application No. 15/243,630, filed on Aug. 22, 2016, now Pat. No. 10,006,273, which is a continuation-in-part of application No. 14/542,038, filed on Nov. 14, 2014, now Pat. No. 9,422,688.

(60) Provisional application No. 61/904,363, filed on Nov. 14, 2013.

(51) Int. Cl.
| | |
|---|---|
| *B32B 27/30* | (2006.01) |
| *B32B 27/32* | (2006.01) |
| *E01C 5/22* | (2006.01) |
| *E01C 9/08* | (2006.01) |
| *E02D 31/00* | (2006.01) |
| *E04H 6/42* | (2006.01) |
| *E21B 41/00* | (2006.01) |

SECTION AA

SECTION BB

SECTION CC

SECTION DD

SECTION EE

SECTION FF

1400

95"

16'

1415

1410

MATTING SYSTEM

CROSS REFERENCES

This application is a divisional of U.S. patent application Ser. No. 17/342,491 filed on Jun. 8, 2021 and entitled "Matting System", and issued as U.S. Pat. No. 11,697,264, which is a continuation of U.S. patent application Ser. No. 16/436,568 filed on Jun. 10, 2019 and entitled "Matting System", and issued as U.S. Pat. No. 11,046,040, which is a continuation of U.S. patent application Ser. No. 15/294,165 filed on Oct. 14, 2016 and entitled "Matting System", and issued as U.S. Pat. No. 10,315,378, which is a continuation-in-part of U.S. patent application Ser. No. 15/243,630, filed on Aug. 22, 2016 and entitled "Containment Mat System", and issued as U.S. Pat. No. 10,006,273, which is a continuation-in-part of U.S. patent application Ser. No. 14/542,038, filed on Nov. 14, 2014 and entitled "Secondary Containment Mat", and issued as U.S. Pat. No. 9,422,688, which claims priority to U.S. Provisional Application Ser. No. 61/904,363, filed on Nov. 14, 2013 and entitled "Secondary Containment Mat". The entire disclosure of each is incorporated herein by reference.

BACKGROUND

Field

Certain aspects of the present disclosure generally relate to matting systems that may be used as a modular assembled surface for various operations, such as containment mechanisms for oil and gas drilling operations, temporary roadways, or working surfaces for operations located in environmentally sensitive areas.

Background

Various operations may occur in areas that may be at least somewhat environmentally sensitive and may utilize matting systems to help protect the ground surface at and around the areas of the operations. For example, oil and gas drilling operations generally involve a drilling rig and associated support equipment that are used to drill and line oil and gas wells. During drilling operations, a significant amount of activity occurs at the drilling site involving many different pieces of drilling equipment and support equipment. In order to reduce environmental impact to the areas adjacent and nearby to drilling sites, sites are commonly lined with liner to help prevent any liquids spilled at the drill site from penetrating the ground or entering a water supply. Additionally, matting may be installed around the drill site to provide a working surface and keep traffic from directly contacting liner material and potentially damaging the liner. Additionally, matting may help reduce impact on the ground area around drill sites from traffic and equipment at the drill site, such as ruts, erosion, excessive soil compaction, etc.

Other types of operations may also benefit from such matting systems, either alone or in combination with containment systems. For example, temporary roads may benefit from such matting systems to provide a reliable roadway surface for vehicles and protect the ground surface from vehicle traffic. In other cases, such as construction at a construction at a site, matting systems may be placed in staging areas and temporary roadways to provide working surfaces and roadways that do not directly contact the ground while also reducing erosion and other damage to the ground.

While helping to reduce environmental impacts, current lining and/or matting may take a significant amount of time and cost to install. Additionally, as liner material is often placed directly on the ground surface, tears and/or punctures may occur, thereby reducing the effectiveness of the liner. Accordingly, it may be desirable to have more efficient and reliable containment and matting systems.

SUMMARY

The described features generally relate to improved containment systems. According to certain examples, a number of containment mats may be placed at and around a drilling site, or any other site where it may be desirable to reduce or prevent contaminants from contacting an underlying surface or where it may be desirable to prevent people or equipment from directly contacting an underlying surface. Each mat, or at least a portion of mats used in such a system, may provide a modular structural mat system that may be installed at a drill site, or other site, adjacent to a number of other mats to provide containment of potential spills, a reliable working surface for drilling operations, and relatively fast and less expensive installation.

In some examples, the top surface may include a number of adjacent boards, and the bottom surface may include a number of boards arranged in a substantially parallel direction to the top surface, with a middle layer of boards that includes a number of boards that are substantially perpendicular to the top and bottom layers of boards. The edges of each may mat be milled to provide a consistent and reliable lap joint that connects adjacent mats. A geotextile, such as a strip of a 100 mil well pad liner, may be placed over the lap joint seams between adjacent mats, and a water or chemical impervious coating placed over the geotextile and a portion of the top surface of adjacent mats. The liner may be, for example, a 100 mil well pad liner. The top, middle, and bottom surfaces may be interconnected through any of a number of techniques, such as adhesive, nails or bolts, for example. In some examples, boards of the top, bottom, and middle layers may be placed directly against adjacent boards of the layer, and all of the boards of each layer may be secured to adjacent boards with an adhesive. Additionally, each layer may be placed directly above/beneath other layers and secured to adjacent layer(s) with an adhesive. In some examples, the assembled mat may be heat treated to a relatively high temperature to set the adhesive securing the boards to create a mat that is highly impenetrable to water and chemicals. A water and chemical impervious coating may be applied to the top of the top surface, and in some examples a traction surface may be applied to the top surface of the mat to provide enhanced traction for people and vehicles that may use the mat. A containment system may be installed by placing mats adjacent to other mats, with complementary portions of lap joints at mat edges forming a lap joint between adjacent mats. A geotextile strip may be used to cover the lap joints, and a top coat of water or chemically impervious material applied to the geotextile strips and at least a portion of the top surfaces of the mats. In some examples, mats may be removed and reused at other locations in a similar manner.

Further scope of the applicability of the described methods and apparatuses will become apparent from the following detailed description, claims, and drawings. The detailed description and specific examples are given by way of illustration only, since various changes and modifications within the spirit and scope of the description will become apparent to those skilled in the art.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
FIG. 1 is a top view of a containment mat apparatus in accordance with various aspects of the present disclosure.

Described examples are directed to apparatuses, systems and methods for improved containment mats and matting systems. According to some examples, a modular matting system may include a number of individual mats that each include a top surface, a middle layer, and a bottom surface. The mat thus provides a modular structural mat that may be installed at a drill site adjacent to a number of other mats to provide containment of potential spills, a reliable working surface for drilling operations, and relatively fast and less expensive installation. In some examples, the top surface may include a number of adjacent boards, the bottom surface may include a number of adjacent boards arranged in a generally parallel direction at the boards of the top surface, and the middle layer may include a number of adjacent boards that are generally perpendicular to the boards of the top and bottom surfaces. In some examples, the liner of adjoining mats may be joined together to provide enhanced spill protection. In other examples, a lap joint connecting adjacent mats may be covered with a strip of liner and an impervious top coat applied over the strip of liner and at least a portion of the adjacent top surfaces.

The top and bottom surfaces may be coupled with the middle layer through any of a number of techniques. In some examples, adhesive is used to connect the top surface, middle layer, and bottom surface. For example, solvent and formaldehyde-free structural polyurethane adhesive may be applied to boards of the top surface, middle layer, and bottom surface. In such examples where adhesive is used between the mat's top surface, middle layer and bottom surface, the mat during the manufacturing process may have substantial and sustained hydraulic pressure applied to top, bottom, and sides of the mat assembly. In other examples, other mechanisms may be used to secure the different layers, such as nails or bolts, for example. In some examples, boards of the top and bottom surfaces and middle layer are bolted together using structural spiral shank fasteners. Thus, a modular structural mat may be provided for use in all stages of, for example, oil and gas well development (e.g., from pad development to drilling, to completions to production). In some examples, a liner material may be placed between two of the layers, or beneath the bottom surface. Such mats may also be used for other applications, such as pipeline companies or utility companies that may use a series of interconnected mats to build a road or other traveling/staging surface during construction, to name but a couple of examples. It will be readily understood by one of skill in the art that such modular structural mats may be used in numerous different applications and environments.

Thus, the following description provides examples, and is not limiting of the scope, applicability, or configuration set forth in the claims. Changes may be made in the function and arrangement of elements discussed without departing from the spirit and scope of the disclosure. Various examples may omit, substitute, or add various procedures or components as appropriate. Also, features described with respect to certain examples may be combined in other examples.

Figures 2, 3:
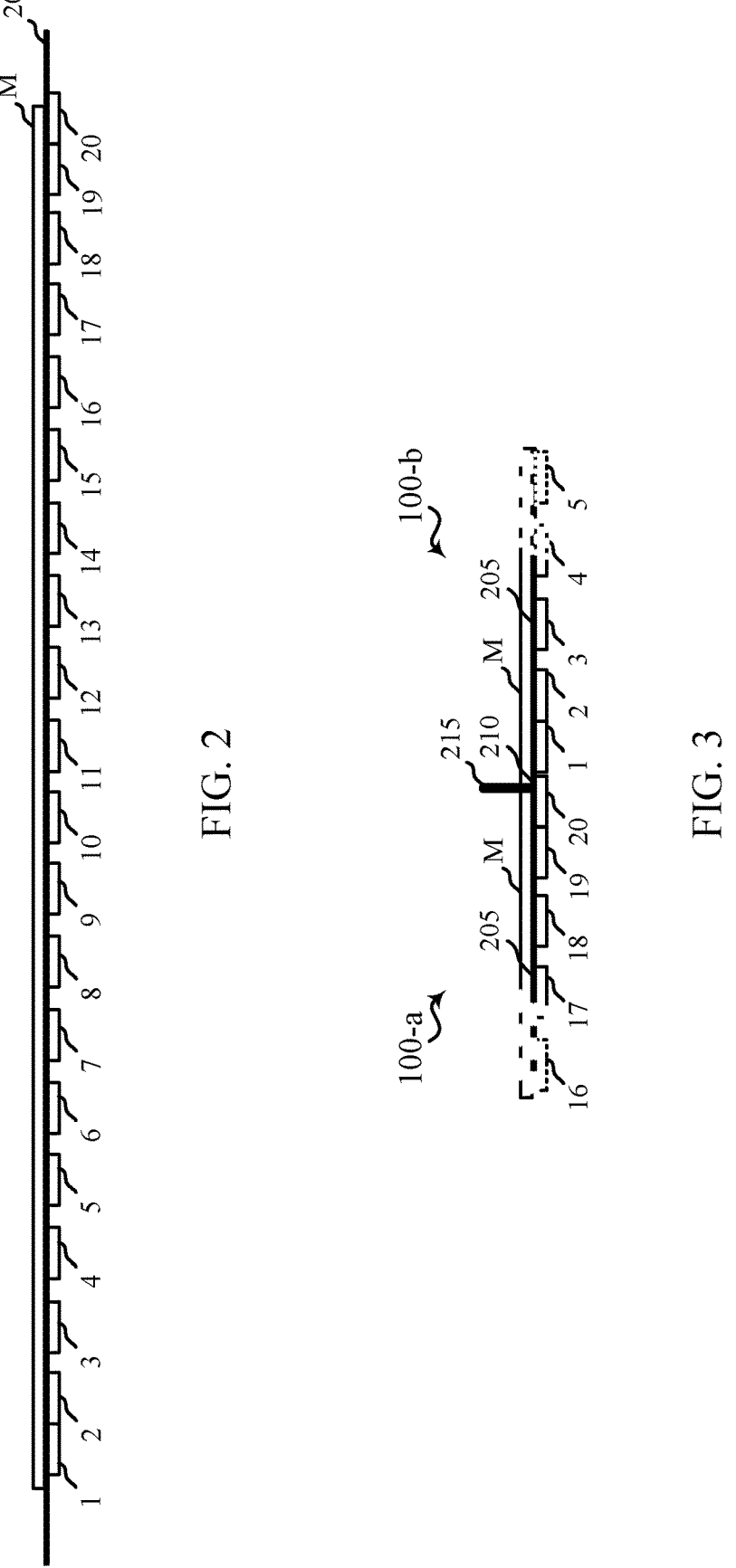
FIG. 2 shows a side view of the containment mat apparatus of FIG. 1 in accordance with various aspects of the present disclosure.
FIG. 3 shows a side view of two adjacent containment mats in accordance with various aspects of the present disclosure.

Referring first to FIGS. 1 and 2, top and side views, respectively, of a mat 100 are illustrated. In this example, the mat is approximately 16 feet (4.88 meters) by 8 feet (2.44 meters). The mat 100 has a top surface made up of dimensional lumber that in this example includes 13 adjacent "2.times.8" pieces of kiln dried lumber, designated as boards A through M in FIGS. 1 and 2. As will be readily recognized by one of skill in the art, a "2.times.8" piece of dimensional lumber may have an actual net board size of 1.5 inches (38.1 mm) by 7.25 inches (184 mm), and thus the 13 adjacent boards A through M result in a width of the mat 100 of approximately 8 feet (2.44 meters). In this example, the boards A-M of the top surface are 16 feet (4.88 meters) long.

The bottom surface in this example includes 20 pieces of dimensional lumber, indicated as 1 through 20 in FIGS. 1 and 2. Boards 1 through 20 are arranged transversely to boards A through M. In this example, the mat 100 includes two adjacent boards (1, 2, and 19, 20) at each end that have little or no gap, with 16 equally spaced boards (3 through 18) with gaps of approximately 27/8 inches (73 mm). Of course, it is to be understood that the dimensions provided here are for purposes of illustration and discussion only, and other dimensions and arrangements may be utilized as will be readily recognized by one of skill in the art. Also, it is to be noted that the figures are not drawn to scale, and various elements may be illustrated as being enlarged or reduced in order to illustrate various concepts and techniques described herein.

Between top and bottom surfaces is a liner 205. Such a liner may be a well pad liner such as commonly used in present day drilling operations, and in some examples is a 100 mil (2.54 mm) liner located between the top and bottom surfaces with a 12 inch (304.8 mm) overlap on all 4 sides. In some examples, the liner 205 may not have any overlap. Thus, the mat 100 provides a two-ply containment with a liner between the plys. The liner 205 may be, for example, a polypropylene composite liner having a number of barrier films sandwiched by geotextile with heat fused surfaces. Such a liner 205 may absorb relatively small leaks and spills, and help prevent larger spills from reaching the ground and/or water supplies. Of course, other suitable liners may be used as well, such as widely available geomembranes or geotextiles that provide water and chemical impervious properties, such as high density polyethylene (HDPE), linear low density polyethylene (LLDPE), polyvinyl chloride (PVC) membranes, or combinations thereof.

During installation, multiple mats 100 may be placed adjacent to one another to provide a lined working surface. FIG. 3 illustrates a partial side view of an intersection of two adjacent mats 100-*a* and 100-*b*. In this example, each mat 100 has a 2 inch lap joint (illustrated in FIG. 1) that may overlap with a corresponding extension of the bottom surface of an adjoining mat 100. The lap joint may, in some examples, may be a milled lap joint that provides a straight and reliable mat edge. The mats 100 may be adjoined, as illustrated at 210 in FIG. 3, to provide adjoining mats 100 that are partially interlocked. As noted above, liner 205 may extend beyond edges of the mats 100, and overlapping areas of adjoining liners may be connected, as indicated at 210 in FIG. 3. Portions of adjoining liners 205 may be sealed together to provide enhanced containment of any spills. Such sealing may be through heat sealing, adhesive, taping, or any other suitable means to interconnect liners 205. The joined liners may be folded down onto the top surface, or excess liner may be cut away. In some deployments, interconnected mats 100, after being interconnected and any sealing completed, may have a top sealing coat applied thereto to provide enhanced containment of potential spills, In some examples, such a top sealing coat may be sprayed onto the mats 100, and gravel, sand, or other enhanced gripping material may be applied with the sealing coat, or separate from the sealing coat, and may provide an enhanced gripping surface on the top surface of the mats 100. In some examples, the top coat may be a two part polymer (e.g., polyurethane) that protects the mat and the liner below. Sand, or other abrasive material, may be integrated into the polymer creating a traction surface to assist with personnel safety.

Figures 4, 5, 6:
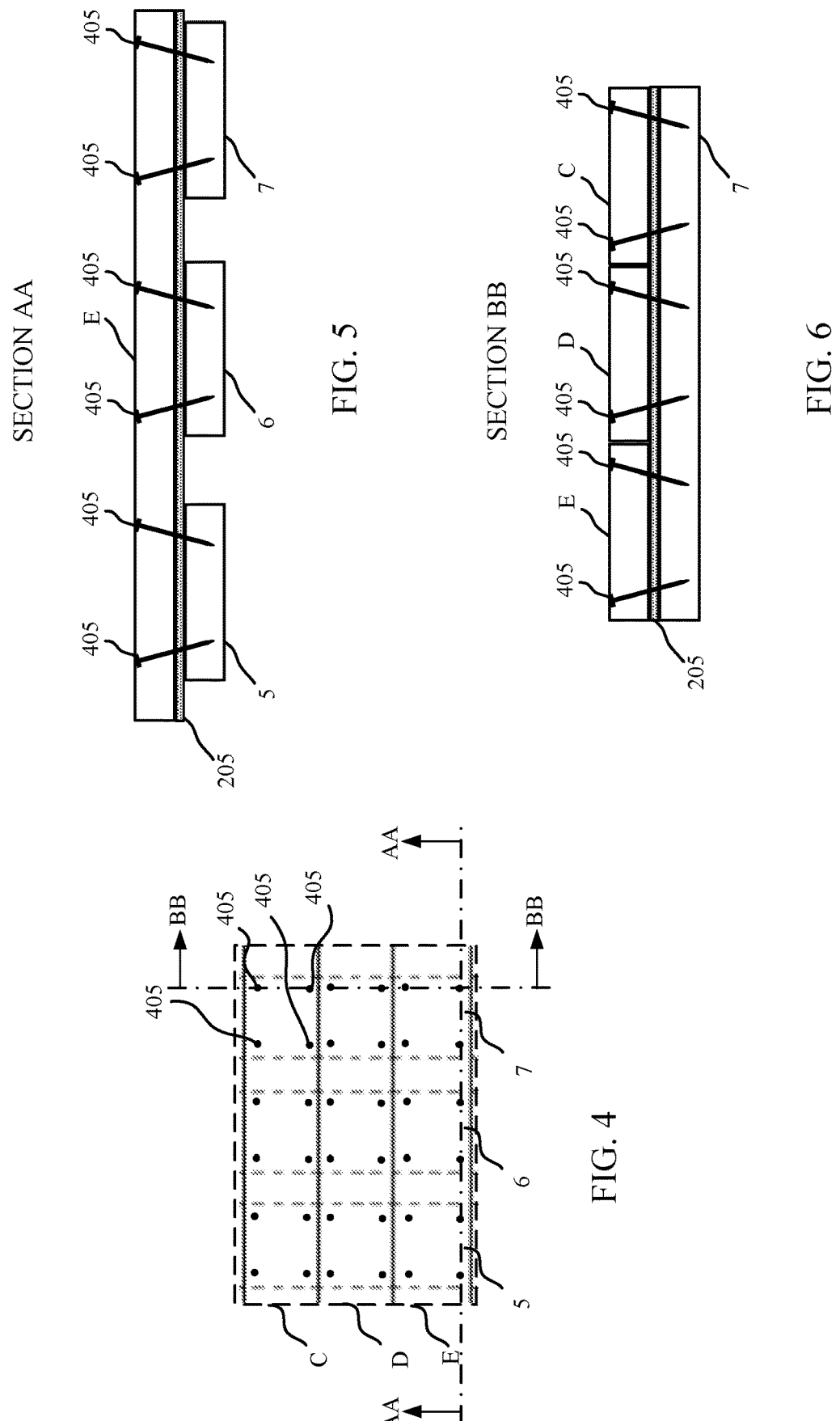
FIG. 4 shows a top view of a portion of a containment mat in accordance with various aspects of the present disclosure.
FIGS. 5 and 6 show cross section views of the mat illustrated in FIG. 5 in accordance with various aspects of the present disclosure.
Figure 7A:
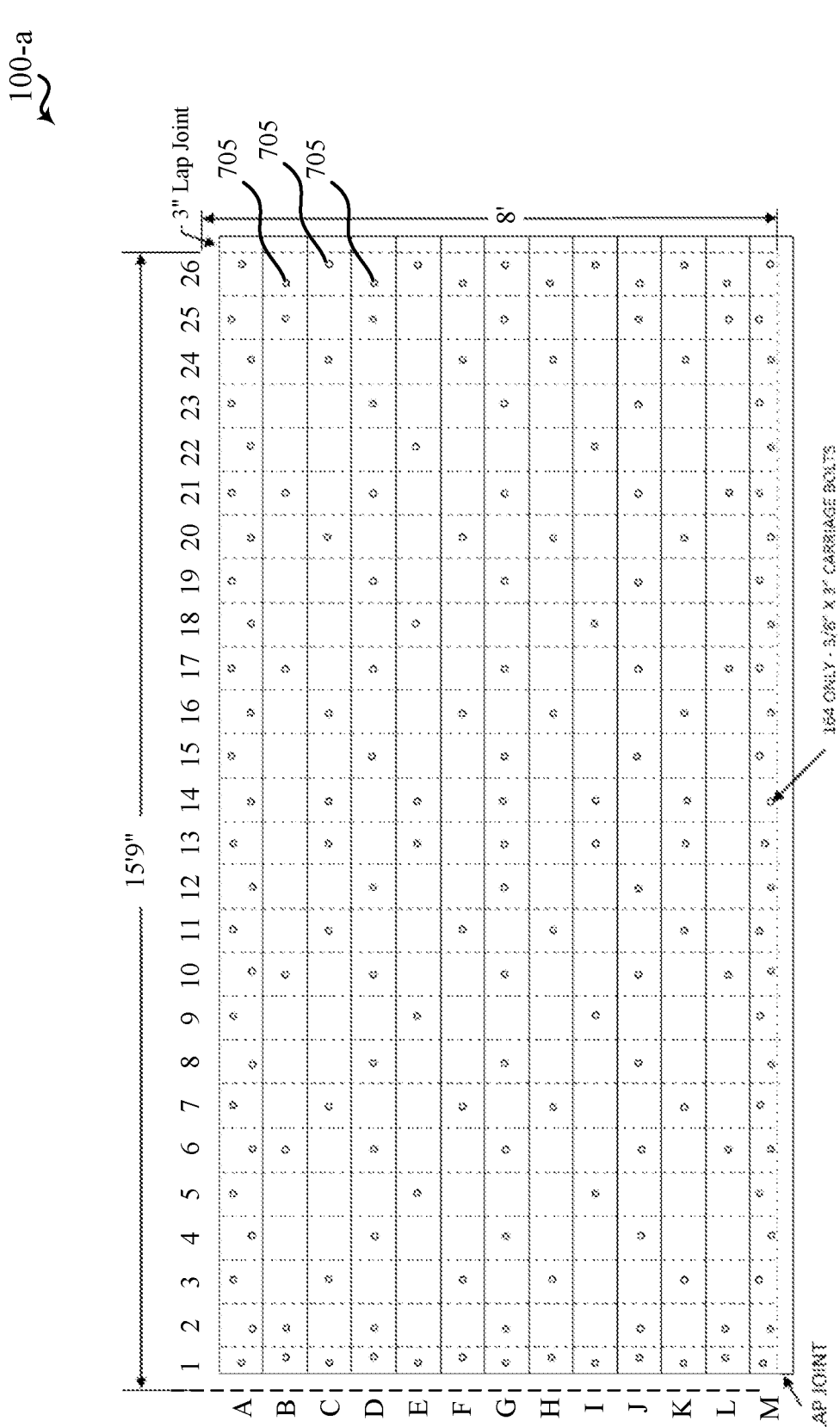
FIG. 7A is a top view of another example of a containment mat apparatus in accordance with various aspects of the present disclosure.
Figures 7B, 8, 9:
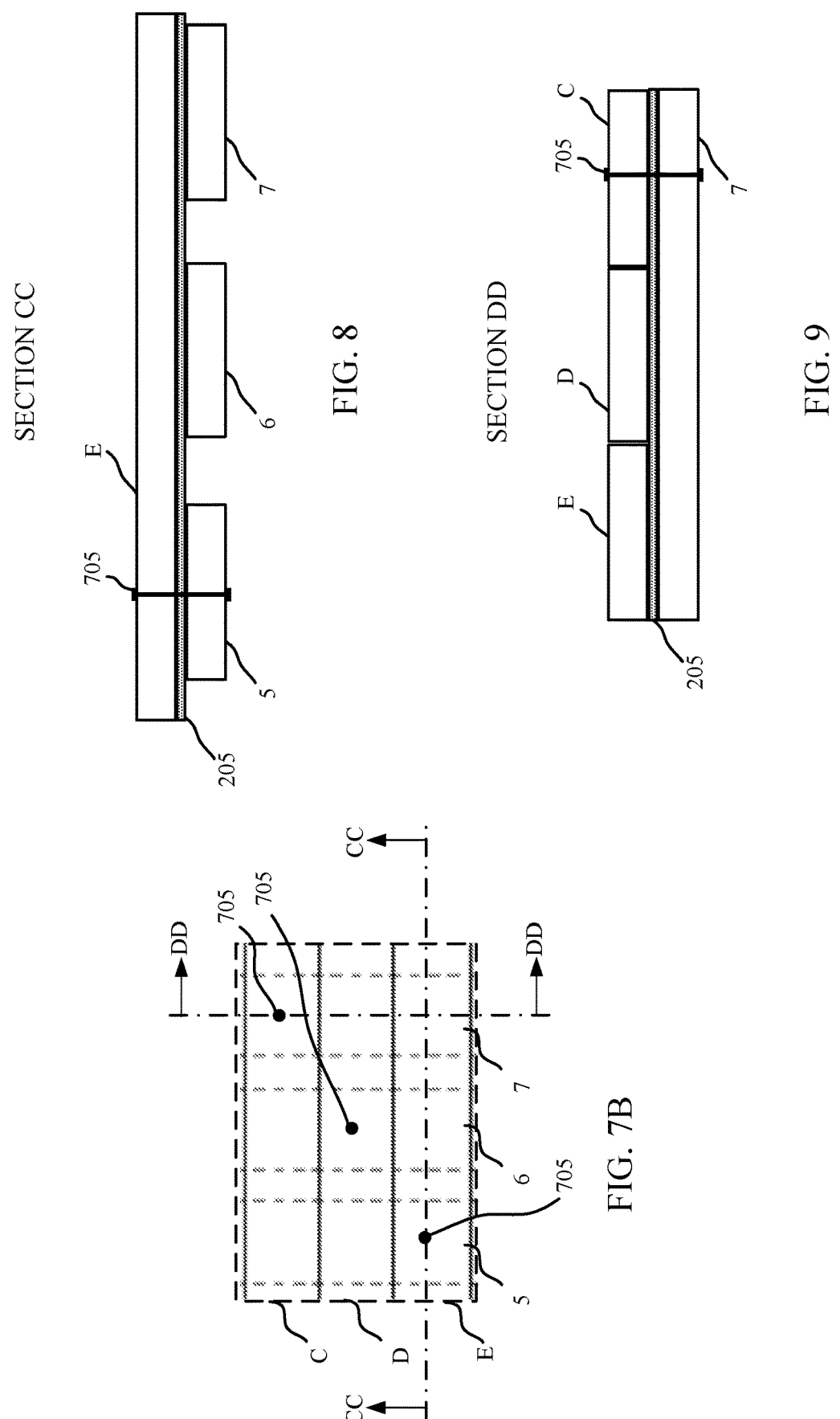
FIG. 7B shows a top view of a portion of the example containment mat of FIG. 7A in accordance with various aspects of the present disclosure.
FIGS. 8 and 9 show cross section views of the mat illustrated in FIG. 7 in accordance with various aspects of the present disclosure.
Figure 10C:
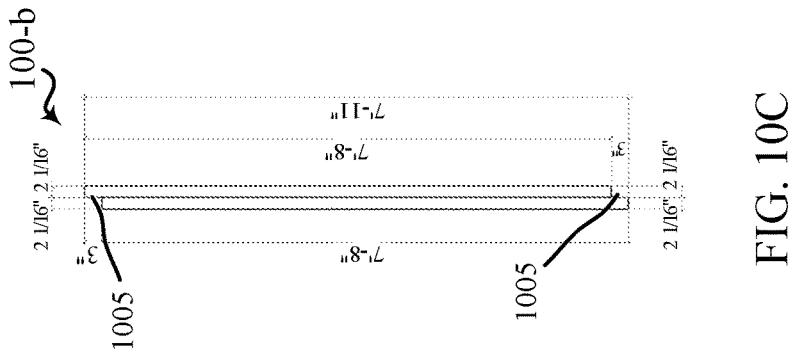
FIGS. 10B and 10C show a side views of the mat apparatus of FIG. 10A in accordance with various aspects of the present disclosure.
Figure 10A:
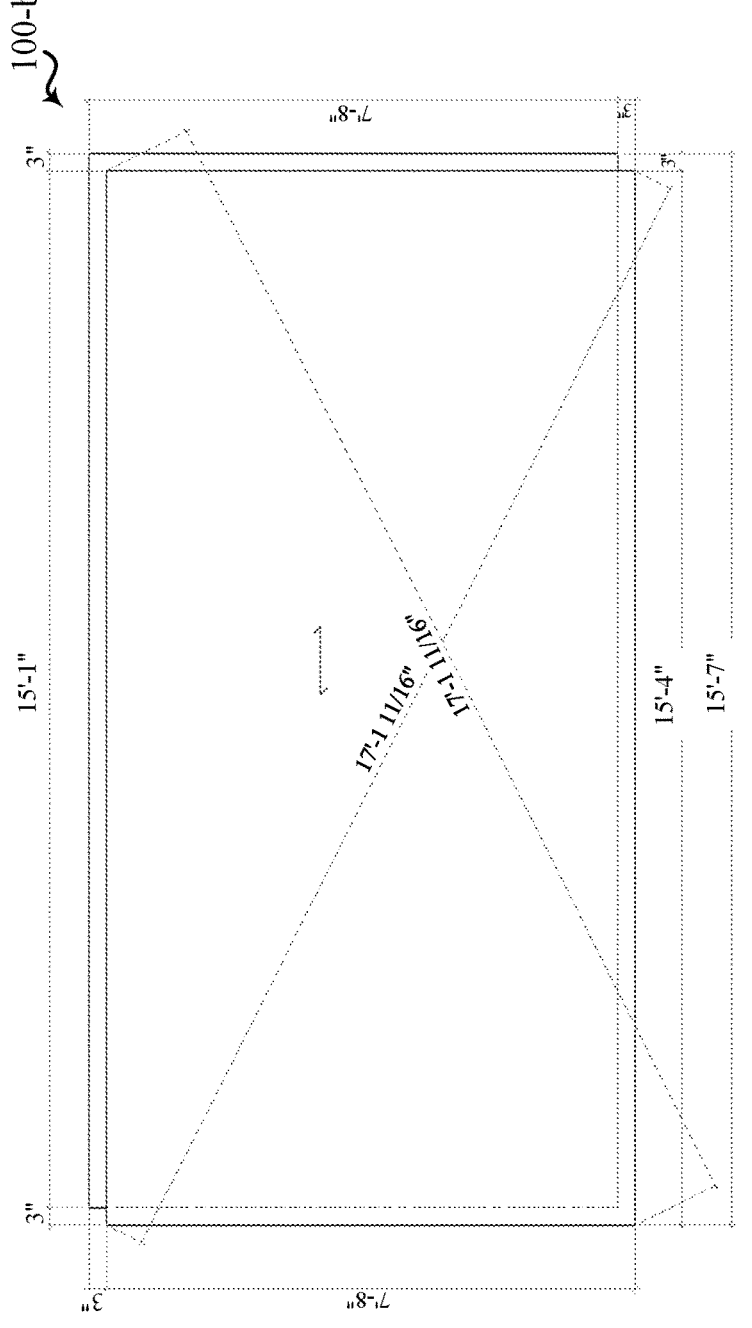
FIG. 10A shows a top view of another example of a mat apparatus in accordance with various aspects of the present disclosure.
Figure 10B:
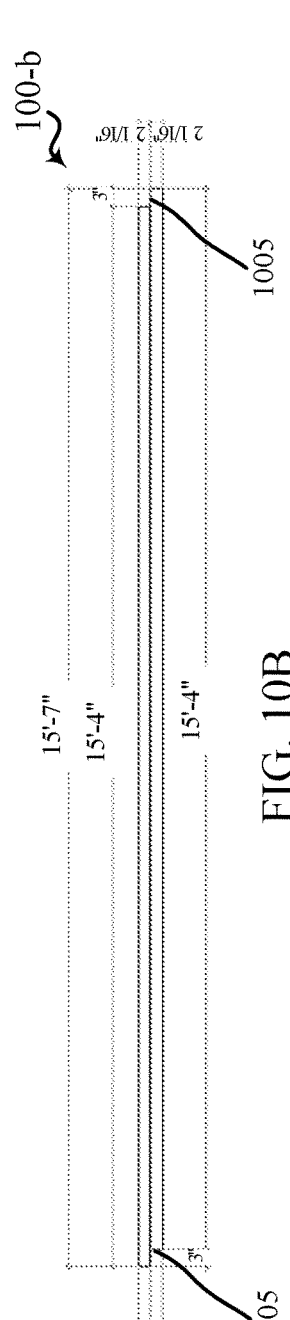

As mentioned above, top and bottom layers of mats 100 may be secured together through any of a number of interconnection techniques. With reference now to FIGS. 4-6, an example is described that utilizes nails 405 for securing boards together. In this example, each intersection of boards in the top and bottom surfaces include four opposed angle structural spiral shank nails. In some examples, nails 405 are coated to prevent rusting (which with a 'common nail' is one of the prime reasons for loosening). A structural spiral shank nail also have relatively high resistance to pull out, which may enhance reliability of the mat 100. Nails 405, in some examples, are three inch nails. Each nail may be angled, as illustrated in cross-section views of FIGS. 5 and 6, from the outer edge of the board intersection, towards the center of the intersection. In some examples, this angle is approximately 12 degrees, and may provide enhanced structural support to mats 100. While nails 405 are illustrated in FIGS. 4-6, it will be readily understood by one of skill in the art that other techniques may be used to secure top and bottom surfaces to one another, such as, for example, different types of nails, bolts, rivets, interlocking members, or other fasteners, adhesives, or combinations thereof. One such example of another technique to secure top and bottom layers of mats 100 is illustrated in FIGS. 7-9, and uses bolts 705 for securing boards together. In this example, a number of intersections of boards in the top and bottom surfaces include a bolt 705 for securing the boards together. In some examples, boards 1-26 and A-M may be secured together with ⅜" (9.5 mm) by 3" (76.2 mm) inch long carriage bolts with 1 inch (25.4 mm) flanged nuts. As discussed above, it will be readily understood by one of skill in the art that other techniques may be used to secure top and bottom surfaces to one another.

Another example of a mat is illustrated in FIGS. 10-13. In this example, three layers of boards, in which boards of different layers are arranged to be non-parallel, are coupled together using adhesive to form the mat 100-*b* of this example, and are milled to provide lap joints 1005 that may interconnect with lap joints 1005 of adjacent mats to provide a matting system. FIG. 10A illustrates a top view of a mat 100-*b* of this example, which has a length of 15 feet, 7 inches (14.75 meters) and a width of 7 feet, 11 inches (2.413 meters). Each edge of the mat 100-*b* may be milled to provide a 3 inch (7.62 cm) lap joint 1005. In various examples, two edges may be milled to provide that the bottom surface of the mat 100-*b* extends beyond the top surface, and the other two edges may be milled to provide that the top surface extends beyond the bottom surface. FIGS. 10B and 10C illustrate front and side views of the mat 100-*b*, respectively.

Figures 11, 12, 13:
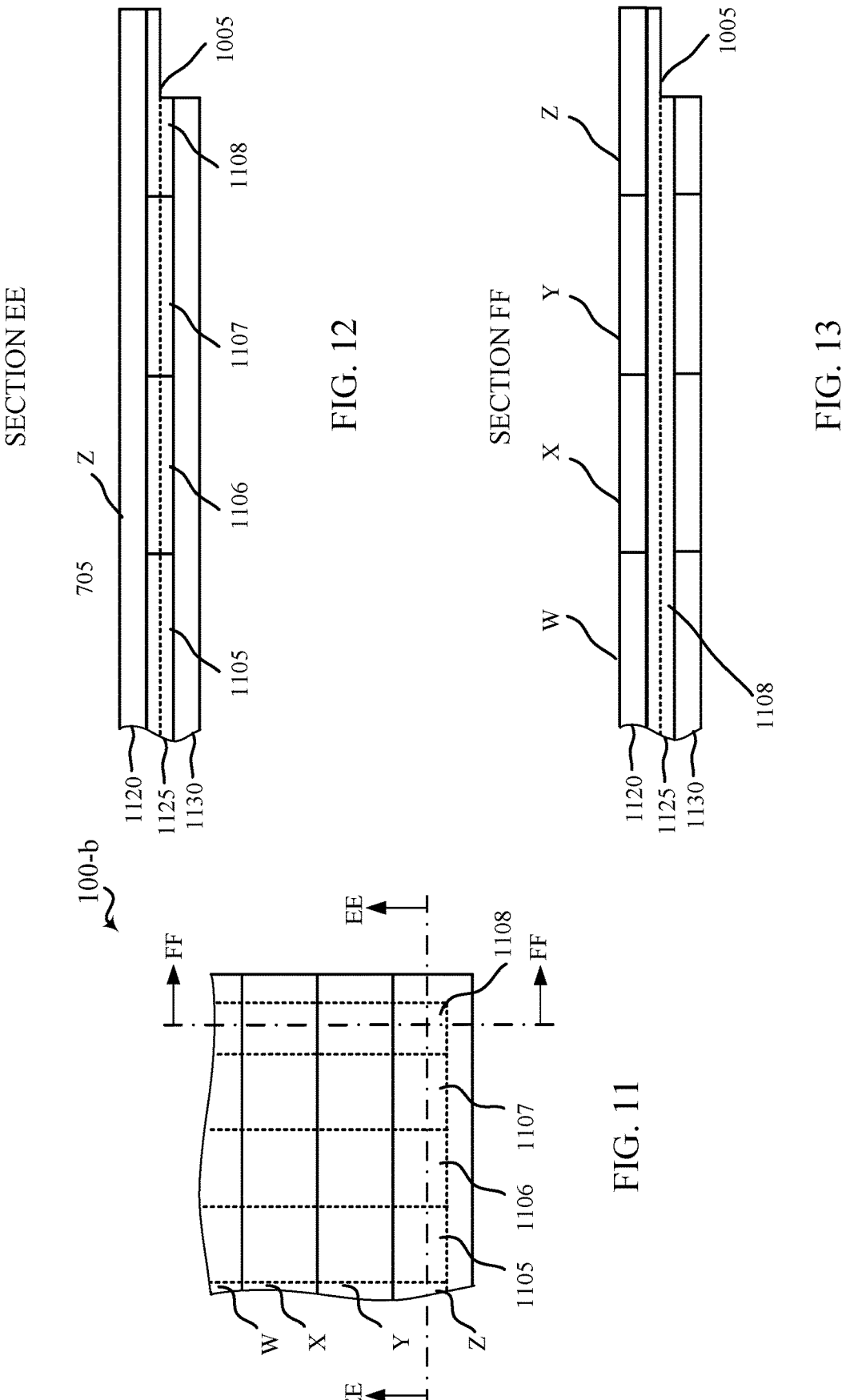
FIG. 11 shows a top view of a portion of the example mat of FIGS. 10A-10C in accordance with various aspects of the present disclosure.
FIGS. 12 and 13 show cross section views of the mat illustrated in FIG. 11 in accordance with various aspects of the present disclosure.

FIG. 11 shows a portion of a mat 100-*b*, FIG. 12 shows a sectional view along section EE of FIG. 11, and FIG. 13 shows a sectional view along section FF of FIG. 11. The mat 100-*b* of this example shows top boards W, X, Y, and Z of top layer 1120 that may form the top surface of the mat 100-*b*, with boards 1105, 1106, 1107, and 1108 of middle layer 1125 shown in broken lines. Boards of the bottom layer that form the bottom surface of the mat 100-*b* may be aligned with the boards of the top layer 1120 and located beneath them in the bottom layer 1130. Of course, it will be readily understood that the boards of the bottom layer 1130 and the top layer 1120 may not be aligned in other examples. Additionally, while top layer 1120 boards and bottom layer boards 1130 are shown to be parallel with each other, and middle layer 1125 boards are shown to be perpendicular to the top layer 1120 and bottom layer 1130 boards, other relative angles of boards of different layers may also be used. As can be observed from FIGS. 12 and 13, when the lap joint 1005 is milled into the mat 100-*b*, it extends through the bottom layer 1130 of boards and extends into the middle layer of boards 1125. Similarly, for other edges of mat 100-*b* where the bottom surface of the mat 100-*b* extends beyond the top surface, when the lap joint 1005 is milled into the mat 100-*b* it extends through the top layer 1120 of boards and extends into the middle layer of boards 1125.

As mentioned above, each of the boards of mat 100-*b* may be secured to adjacent boards of the same layer, as well as to adjacent boards of layers above and/or beneath, using adhesive. Additionally, in some examples, the mat 100-*b* may be heat treated at temperatures above 700 degrees Fahrenheit, which may enhance the adhesion between boards as well as eliminate any organisms that may be within the boards. In some examples, lap joints 1005 in the mat 100-*b* may be formed by using a router on the assembled mat 100-*b*, which may provide uniform edges of mats 100-*b* and enable efficient and reliable connections at the lap joints 1005 of adjacent mats. In examples such as in FIGS. 10-13, the adhesion of adjacent boards directly together in each layer, and the non-parallel angles of boards in directly adjacent layers may provide a mat that is substantially impervious to liquid penetration through the mat. In some examples, similarly as discussed with respect to other examples herein, a coating may be applied to the top and/or bottom surfaces of each mat to further enhance the impermeability of the mats. Additionally, sealing of the joints between adjacent mats may be provided in accordance with the examples provided herein, such as through securing a geotextile strip along the joints between adjacent mats and sealing the geotextile strip to the top surface of the mats.

Figure 14:
FIG. 14 shows a top view of another containment mat apparatus in accordance with various aspects of the present disclosure.
Figures 15, 16:
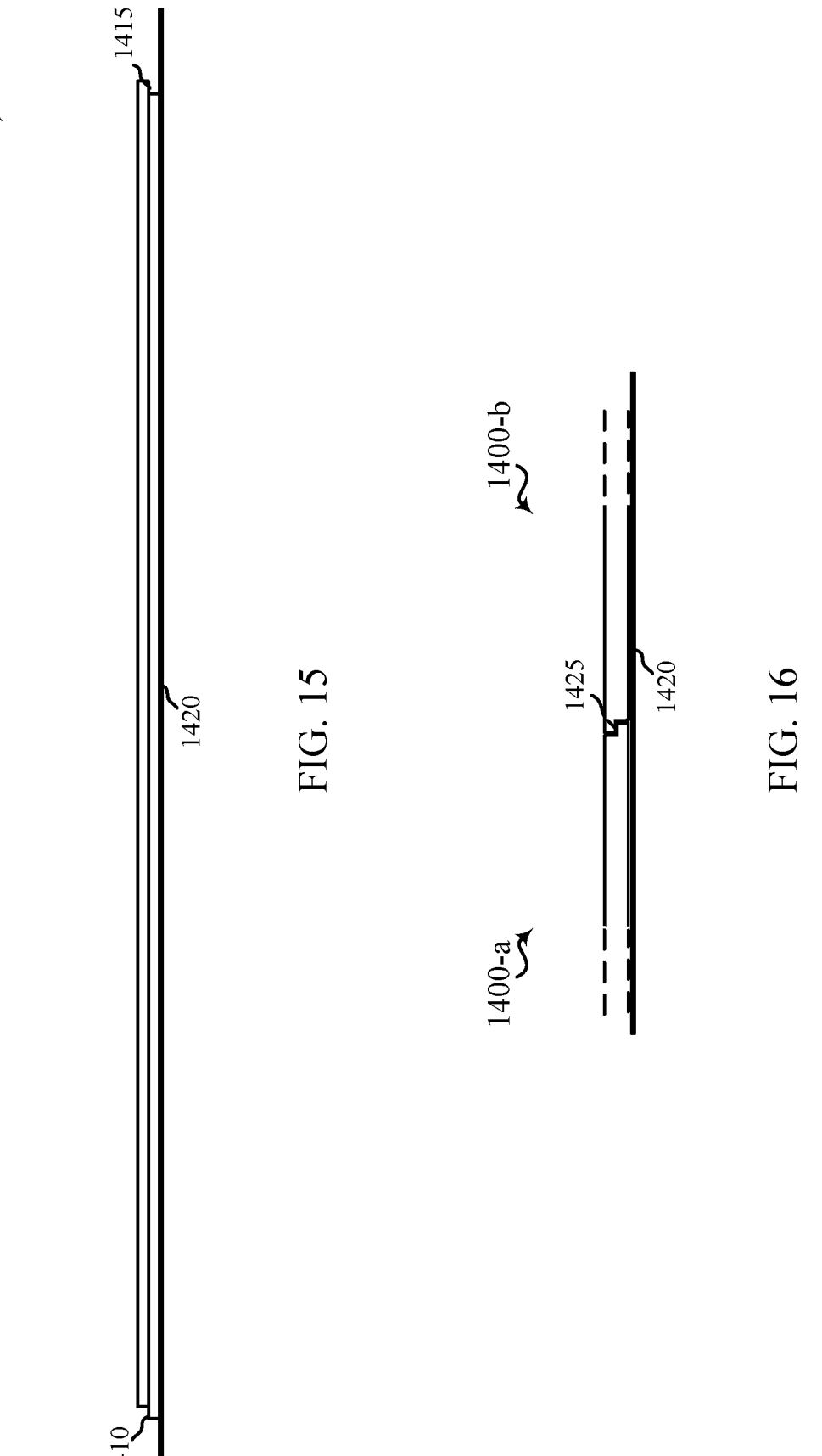
FIG. 15 shows a side view of the containment mat apparatus of FIG. 14 in accordance with various aspects of the present disclosure.
FIG. 16 shows a side view of two adjacent containment mats of FIG. 14 in accordance with various aspects of the present disclosure.

Referring next to FIGS. 14 and 15, top and side views, respectively, of an exemplary mat 1400 are illustrated. In this example, the mat is again approximately 16 feet (4.88 meters) by 8 feet (2.44 meters). The mat 1400 in this example is made of an engineered wood product and is a single piece of material. In some examples, the mat may be formed from multiple plys of laminated wood material that may be arranged with different orientations to provide substantial strength and durability. In some examples, the mat may be formed from cross laminated timber, such as Crosslam™ Ultracore available from StructureLam of Penticton, British Columbia, Canada. Again, it is to be understood that the dimensions provided here are for purposes of illustration and discussion only, and other dimensions and arrangements may be utilized as will be readily recognized by one of skill in the art. Also, it is to be noted that the figures are not drawn to scale, and various elements may be illustrated as being enlarged or reduced in order to illustrate various concepts and techniques described herein. In certain examples, mats 1400 may be configured to be interconnected through a joint 1425, shown in FIG. 16, having a bottom shelf 1410 and a top extension 1415. Of course, other types of joints 1425 may be implemented, such as a tongue and groove, etc.

A liner 1420 may be placed under some or all of a number of mats 1400, as illustrated in FIGS. 15 and 16, in some examples. Such a liner may be a well pad liner such as commonly used in present day drilling operations, and in some examples is a 140 mil liner. The liner 1420 may be, for example, a polypropylene composite liner having a number of barrier films sandwiched by geotextile with heat fused surfaces. Such a liner 1420 may absorb relatively small leaks and spills, and help prevent larger spills from reaching the ground and/or water supplies. Of course, other suitable liners may be used as well, such as widely available geomembranes or geotextiles that provide water and chemical impervious properties, such as HDPE, LLDPE, or PVC membranes, or combinations thereof.

During installation, multiple mats 1400 may be placed adjacent to one another to provide a lined working surface. FIG. 16 illustrates a partial side view of an intersection of two adjacent mats 1400-*a* and 1400-*b*. In this example, each mat 1400 is interconnected at joint 1425, to provide adjoining mats 1400 that are partially interlocked. In some deployments, as discussed above, interconnected mats 1400, before or after being interconnected, may have a top sealing coat applied thereto to provide enhanced containment of potential spills. In some examples, such a top sealing coat may be sprayed onto the mats 1400, and gravel, sand, or other enhanced gripping material may be applied with the sealing coat, or separate from the sealing coat, and may provide an enhanced gripping surface on the top surface of the mats 1400. The top sealing coat may be, in some examples, a two part polymer (e.g., polyurethane) top coat.

Figure 17:
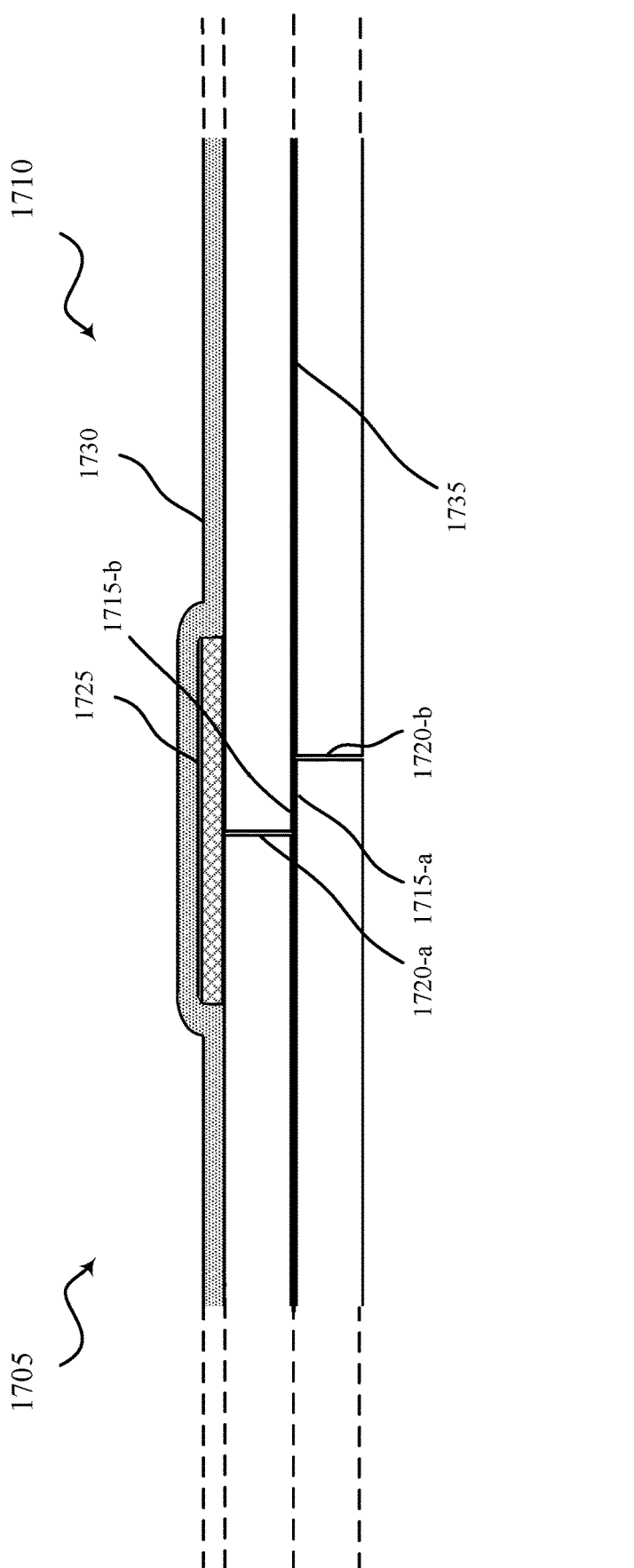
FIG. 17 shows a side view of another example of two adjacent containment mats in accordance with various aspects of the present disclosure.

In other examples, the liner 205 such as discussed above may be cut even with mat edges, and adjacent mats may be placed with closer contact and fewer gaps. In such examples, a strip of geotextile may be placed over joints between adjacent mats to provide a seal between mats. FIG. 17 illustrates a partial side view of an intersection of two adjacent mats 1705 and 1710. In this example, each mat 1705 and 1710 may be interconnected by a lap joint formed from complementary checks 1715 and shoulders 1720 of adjacent mats 1705 and 1710. The lap joint may be covered by a geotextile strip 1725 to provide a seal over any gaps that may be present in the lap joint. The geotextile strip 1725 may be, for example, a strip of a polypropylene composite liner having a number of barrier films sandwiched by geotextile with heat fused surfaces. Of course, other suitable strips of geotextile may be used as well, such as widely available geomembranes or geotextiles that provide water and chemical impervious properties, such as HDPE, LLDPE, or PVC membranes, or combinations thereof. A water and chemical impervious top coat 1730 may then be applied to the geotextile strip 1725 and at least a portion of the top surfaces of the adjacent mats 1705 and 1710. In some examples, such a top coat may be sprayed onto the mats 1705 and 1710, and the geotextile strip 1725, and gravel, sand, or other enhanced gripping material may be applied with the top coat while it is curing, and may provide an enhanced gripping surface on the top surface of the mats 1705 and 1710. In other examples, a gripping surface may be applied separate from the top coat 1730. The top coat 1730 may be, in some examples, a two part polymer (e.g., polyurethane) top coat that provides a chemical and water impervious coating.

A system such as illustrated in FIG. 17 may provide an enhanced connection between each mat relative to mats having a liner 1735 between the top and bottom surfaces that extends beyond an edge of the mat. The mats 1705 and 1710 of this example may be constructed using techniques such as discussed above with respect to FIGS. 1-12, and may have their edges milled to provide a relatively straight and uniform check 1715 and shoulder 1720, such that when the lap joints on two adjoining mats are placed together there is little to no gap between each mat. This helps to reduce the area in which water or chemicals may penetrate between each mat, and further may reduce slip, trip, and fall hazards. Such a technique may result in a nearly continuous matted surface at a drilling site, or other site that may benefit from a matting system such as described herein.

The flush connection between formed by the lap joints between each adjoining mat, along with the geotextile strip 1725 and top coat 1730 create a water and chemical resistant seal between each mat. As discussed, a traction material such as sand can also be applied while the top coat 1730 polymer is curing to provide a traction surface that may be similar or identical to a traction surface that covers other portions of the top surfaces of the mats 1705 and 1710. In some examples, the flush connection between mats 1705 and 1710, coupled with the geotextile strips 1725 and polymer seal top coat 1730 between each mat creates a continuous surface and eliminates the need to place containment liner under the matting structure.

In some examples, when operations at a drilling site, or other industrial or utility application, are complete and the mats are to be removed, the joint seal is cut apart and the mats 1705 and 1710 removed. When the mats 1705 and 1710 are separated, each will have a geotextile and polymer bonded to it that becomes part of the mat. The mat may then be redeployed to another site. Once in place, another geotextile strip 1725 and polymer top coat 1730 may be applied to lap joints interconnecting adjacent mats. Thus, with every deployment of the matting system, the seal will become stronger and more resilient. Such a process may be repeated as many times as necessary. When there becomes too much build-up of polymer/geotextile over the joint area between each mat, the seam may be removed by, for example, a grinding process, and the process can be repeated for the life of each mat.

Figure 18:
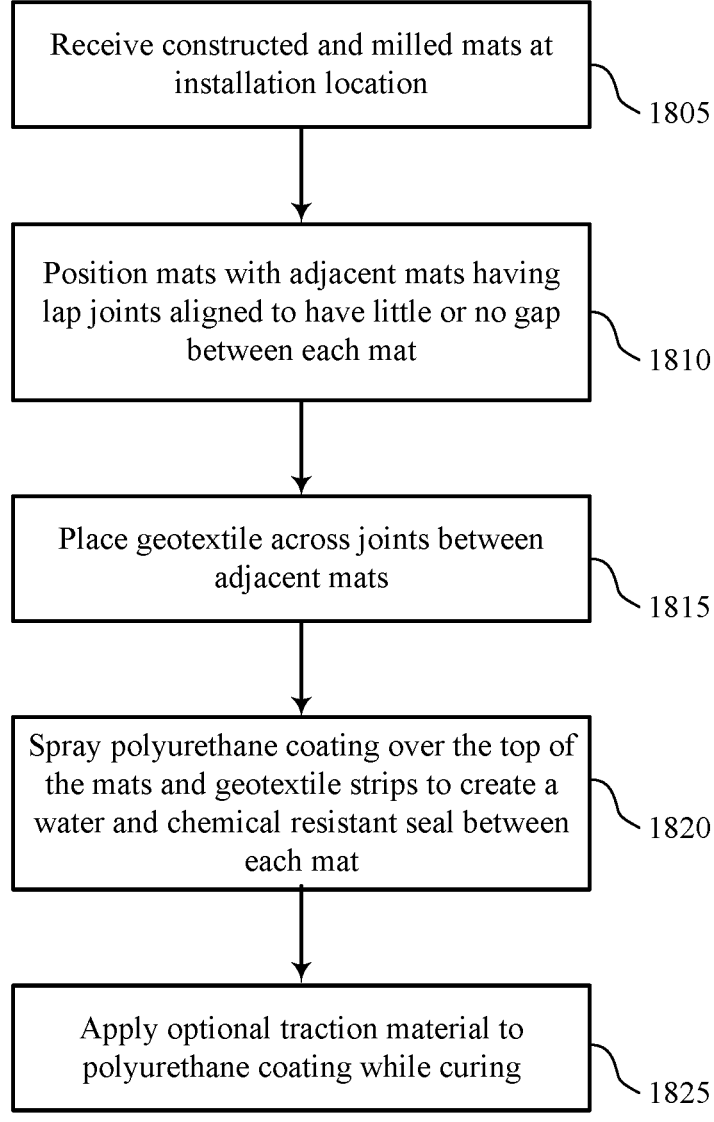
FIG. 18 shows a method for installing a containment system in accordance with various aspects of the present disclosure.

With reference now to FIG. 18, a method for installing a containment system is described in accordance with aspects of the present disclosure. In this example, a number of mats may be received at an installation location, as indicated at block 1805. The mats, as discussed above, may be previously constructed and milled to provide straight and consistent mat edges that may include checks and shoulders such that a lap joint may be formed between adjacent mats. In some examples, the mats may be rectangular, with a check extending from a top surface of two of the edges and extending from a bottom surface of the other two edge. Each edge of the mat may have a corresponding shoulder such that complimentary edges may form a lap joint having a relatively flush fit.

At block 1810, the mats may be positioned with adjacent mats having lap joints aligned to have little or no gap between each mat. In some examples, mats may be positioned using a vacuum lift attachment that may be attached to a material handler or other equipment. In such examples, the top surface of the mats may provide a surface that a vacuum lift attachment may use to hold the mat such that the material handler or other equipment may lift the mat and move the mat to a desired location. The mat may then be placed adjacent to another mat and moved such that adjacent mat edges interconnect at lap joints. In some examples, a newly placed mat may be further moved into a flush position with one or more adjacent mats through striking of an opposite mat edge with a mallet or other suitable tool.

At block 1815, a geotextile may be placed across joints between adjacent mats. As discussed above, in some examples a geotextile strip may be placed over lap joints of neighboring mats, to provide a water and chemical impervious covering over the associated lap joint. At block 1820, a polyurethane coating may be sprayed over the top of the mats and geotextile strips to create a water and chemical resistant seal between each mat. At optional block 1825, a traction coating may be applied to the polyurethane coating while curing. In other examples, a separate traction surface may be applied after the polyurethane coating cures, or no traction surface may be present at the joints between adjacent mats. As mentioned above, once operations at a site are concluded, mats may be cut apart and the operations of FIG. 18 may be repeated at another site.

The previous description of the disclosure is provided to enable a person skilled in the art to make or use the disclosure. Various modifications to the disclosure will be readily apparent to those skilled in the art, and the generic principles defined herein may be applied to other variations without departing from the spirit or scope of the disclosure. Throughout this disclosure the term "example" or "exemplary" indicates an example or instance and does not imply or require any preference for the noted example. Thus, the disclosure is not to be limited to the examples and designs described herein but is to be accorded the widest scope consistent with the principles and novel features disclosed herein.

What is claimed is:

1. A modular structural mat system, comprising:
a plurality of mats, including a first mat and a second mat, each mat comprising:
    a top layer comprising a first plurality of adjacent boards that each have a corresponding major axis that extends along a length thereof in a first longitudinal direction;
    a bottom layer comprising a second plurality of adjacent boards that each have a major axis that extends along a length thereof in the first direction;
    a middle layer located between the top layer and the bottom layer comprising a third plurality of adjacent boards that each have a major axis that extends along a length thereof in a second direction that is different than the first direction; and
    a check and a shoulder along each edge of the first mat and the second mat, wherein the first mat is located adjacent to the second mat and the check and shoulder along a first edge of the first mat is engaged with a complementary check and shoulder along a second edge of the second mat to form a lap joint;
    a geotextile covering the lap joint between the first mat and the second mat; and
    a water-resistant seal covering the geotextile and at least a portion of the top layer of each of the first mat and the second mat.

2. The modular structural mat system of claim 1, wherein each board of the top layer is coupled with one or more boards of the middle layer with an adhesive.

3. The modular structural mat system of claim 2, wherein each board of the top layer is coupled with one or more adjacent boards of the top layer with the adhesive.

4. The modular structural mat system of claim 1, wherein the geotextile is a 100 mil well pad liner.

5. The modular structural mat system of claim 1, further comprising a top coat applied to the top of the top layer.

6. The modular structural mat system of claim 5, wherein the top coat includes a traction layer to provide enhanced traction for people and vehicles.

7. The modular structural mat system of claim 5, wherein the top coat comprises a two part polymer adapted to protect each mat, and sand integrated into the two part polymer to provide a traction layer.

8. The modular structural mat system of claim 5, wherein the water-resistant seal comprises a same material as the top coat and covers at least a portion of the top coat.

* * * * *